Dec. 26, 1967     T. K. KEHLER     3,360,006
AUTOMATIC VALVE
Filed Oct. 9, 1963
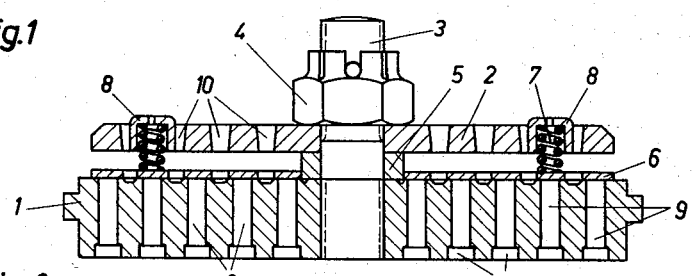
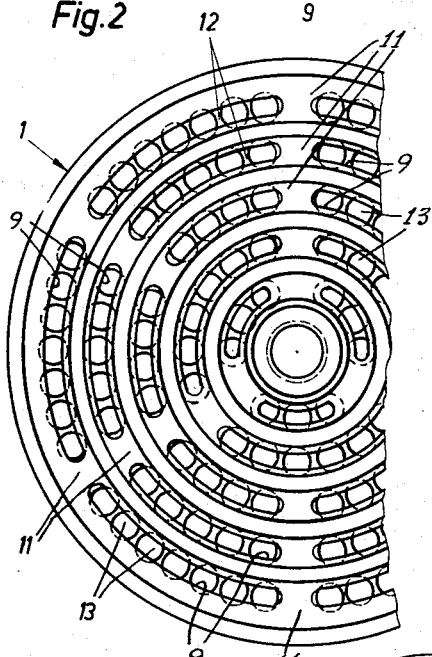
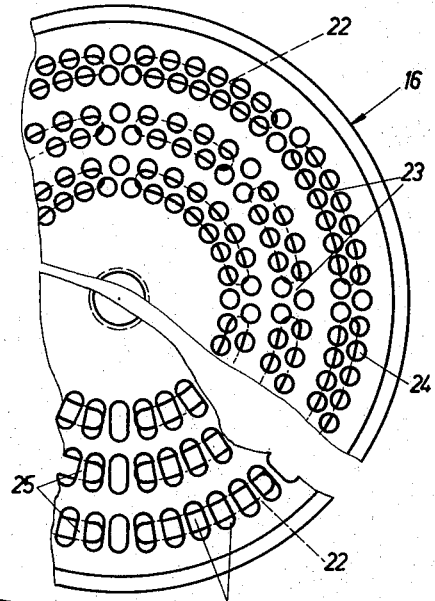
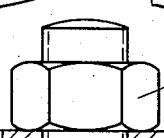
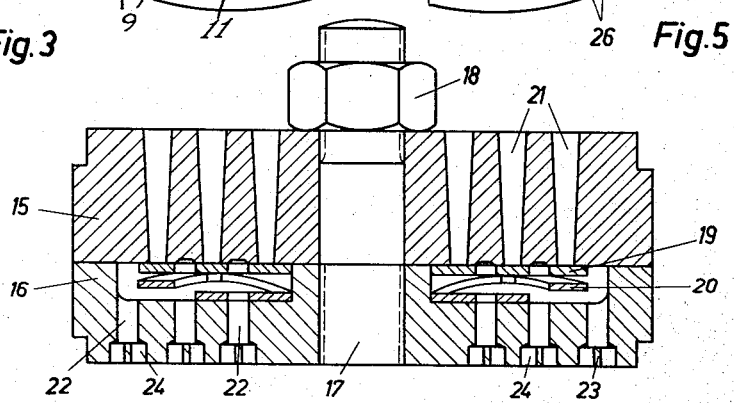
Inventor
Theodor Karl Kehler
By
Watson Cole Grindle + Watson
Attys.

United States Patent Office 3,360,006
Patented Dec. 26, 1967

3,360,006
AUTOMATIC VALVE
Theodor Karl Kehler, Vienna, Austria, assignor to Hoerbiger Ventilwerke Aktiengesellschaft, Vienna, Austria
Filed Oct. 9, 1963, Ser. No. 314,962
Claims priority, application Austria, Oct. 27, 1962,
A 8,497/62
3 Claims. (Cl. 137—516.13)

ABSTRACT OF THE DISCLOSURE

Automatic valve, particularly for compressors, which has two plate-shaped portions, with passageways therethrough, of which one forms a valve seat and the other a valve guard, and both are ranged in spaced relationship. There is a closing member and spring means are provided between plate-shaped portions.

---

The invention relates to an automatic valve, particularly for compressors, comprising two plate-shaped portions one forming a valve seat and the other a valve guard, both portions being arranged in spaced relation to each other, a closing member and spring means between said plate-shaped portions, and oblong channels provided in at least one of said plate-shaped portions and being separated from each other by webs.

With conventional valves of this type it is frequently desirable or even necessary to prevent foreign bodies from passing through the valve channels. In particular, with compressors equipped with similar valves, fragments of the closing element or the spring means thereof, but also other foreign bodies are liable to enter the cylinder and cause damage to the piston, the valves etc. Therefore, the suction valve guards or the delivery valve seats have been designed with narrow bores instead of oblong channels. Although this will prevent the entry of large foreign bodies into the cylinder, this measure also entails an increase of the flow resistance as compared with valves presenting oblong channels which is a disadvantage particularly in high-speed compressors.

Another known precaution consists in providing screens or screen plates between the valves and the cylinder of the compressor. These departures from the standard valve and/or compressor design, however, entail considerable technical drawbacks and additional expenses. For example, it is generally difficult to provide sufficient space for special valves or screens in the valve emplacements of the compressors. In addition, dead spaces and pressure losses in the valves due to the incorporation of screens or screen plates are considerably increased. Nor did the incorporation of screen bodies made of coiled wire or the like in the valve channels themselves afford an all-round solution to the problem, since these screen bodies or the like also require additional space. Furthermore, additionally incorporated screen bodies or screen plates occasionally tend to vibrate during the operation of the valve, thus considerably increasing the operational noise.

The invention constitutes a new departure precluding the shortcomings of conventional types by partitioning the channels in the valve seat and/or the valve guard in the area of their outlet on the outer side of the valve by means of additional webs so as to provide apertures with a small cross-section, preferably bores, as a protection against the passage of foreign bodies, particularly of fragments of the closing member or of the spring means thereof. This partitioning fully preserves the advantages of conventional valves comprising channels consisting of narrow bores extending over the entire height of the valve seat and/or of the valve guard, while avoiding their shortcomings. Experiments have shown the flow resistance in the valve according to the invention to be the same or only slightly greater than with conventional valves presenting oblong channels. Moreover, the additional webs in the area of the oblong channels augment the mechanical resistance of the seat and/or the valve guard, so that with equal stresses these parts can be of lesser height, thereby reducing both the dead space and the flow resistance still further. The design according to the invention is also particularly suitable for valves comprising safety valve guards. Preferably the additional webs provided for according to the invention are located in the valve seat of pressure valves and in the valve guard of suction valves. However, they may also be arranged both in the valve seat and in the valve guard.

The flow resistance of the valve can be maintained at an adequately low level by further measures according to the invention. In a preferred embodiment of the invention the apertures with a small cross-section and the additional webs extend over no more than one third of the height of the valve seat and/or of the valve guard. Furthermore, the width of the apertures as measured in transverse relation to the oblong channels can be greater than the width of the channels, the said openings consisting for example, in bores having a diameter greater than the width of the oblong channels, but they may also present an oblong cross-section. The free cross-sectional area of the channels of the valve remaining approximately constant over the entire height of the valve seat and/or of the valve guard in spite of the provision of additional webs. Moreover, the individual cross-section liable to be used for the passage of foreign bodies are thereby sufficiently small, since the latter are likely to pass only through the surface portions of the apertures and of the oblong channels which as viewed from above, overlap each other. In order to enable the cross-section of the apertures to be still further reduced without at the same time substantially increasing flow resistance, the invention provides for an arrangement by which each of the oblong channels communicates with at least two rows of adjacent apertures which are preferably offset in relation to each other.

According to a further embodiment of the invention the apertures presenting a small cross-section together with the additional webs can be provided in a separate screen plate positively connected by welding or the like processes with the valve seat and/or valve guard. Under certain circumstances this measure is apt to facilitate the manufacture of the valve since the valve seat and/or the valve guard can be produced by conventional methods with oblong channels, the latter being covered at a later stage only. Owing to the positive connection of the screen plate with the the valve seat and/or the valve guard, the advantageous features of the invention, such as in particular, slight flow resistance, smallness of dead spaces and considerable solidity, are preserved.

Further details of the invention will appear from the following description of several embodiments of the invention with reference to the accompanying drawings in which:

FIG. 1 shows an axial cross-section through a valve according to the invention,

FIG. 2 illustrating the valve seat of the same in plan view,

FIG. 3 represents a cross-sectional view of another embodiment of the invention, FIG. 4 shows the valve guard pertaining to the valve of FIG. 3 as viewed from below, and FIG. 5 shows an analogous worm's-eye-view of a further variant of the valve guard.

The pressure valve illustrated by way of example in FIGS. 1 and 2 comprises two plate-shaped portions one forming a valve seat 1 and the other a valve guard 2, connected with each other by means of bolt 3 and nut 4. A ring 5 provided between the valve seat 1 and the valve guard 2 determines the distance between these two members and also serves as a guide for the closing member represented by the valve plate 6. The latter is loaded by helical springs 7 distributed over its periphery, said springs being located in the emplacements 8 of the valve guard 2. Concentric oblong channels are provided both in the valve seat 1 and in the valve guard 2, those in the valve seat being designated by reference number 9 and those in the valve guard by number 10. As appears from FIG. 2, the oblong channels 9 in the valve seat 1 are separated from each other by radially extending webs 11.

In order to protect the valve against the passage of foreign bodies, and in particular, to prevent fragments of a broken valve plate 6 or of the helical springs 7 from falling through the channels 9 into the cylinder of a compressor equipped with a valve according to the invention, the channels 9 of the valve seat 1 are partitioned by means of additional webs 12 so as to produce apertures 13 presenting a small cross-section. In the embodiment shown in FIGS. 1 and 2 the apertures 13 are drilled and present a larger diameter than the width of the channels 9, the overall cross-sectional area of the channels of the valve in the area of the apertures 13 being in spite of the presence of webs 12 approximately the same size as in the area of the oblong channels 9. Again, the webs 12 together with the apertures 13 extend only over a fraction of the height of the valve seat 1, precisely not over one third of the same.

The embodiment illustrated in FIG. 3 represents a suction valve comprising a valve seat 15 and a valve guard 16 designed as a so-called safety valve guard and clamped together with the valve seat 15 on the outer border at the assembling of the valve. The clamping bolt of the valve is designated by reference number 17 and its nut by number 18. Located in the stroke gap between the valve seat 15 and the valve guard 16 are the valve plate 19 and the spring plate 20. Here too, oblong channels 21 are provided in the valve seat 15 and similar channels 22 in the valve guard 16. As different from the pressure valve shown in FIG. 1, in the suction valve illustrated in FIG. 2 the channels 22 in the valve guard 16 are partitioned by means of additional webs 23 so as to produce apertures 24 having a small cross-section. As appears from FIG. 4, each of the channels 22 of the valve guard 16 communicates with two rows of adjacent apertures 24, said apertures being offset in relation to each other so as to avoid excessive thickness of their intermediate webs 23, thereby affording protection against the passage of even relatively small foreign bodies or fragments of the closing member without noticeably reducing the free cross-sectional area of the valve. However, the apertures associated with each channel can also be arranged in three or more rows.

According to a slightly modified variant as shown in FIG. 5 the apertures 26 divided by webs 25 are designed as slots arranged in transverse relation to the oblong channels 22. The slots present a comparatively large cross-section available for the passage of the medium and yet afford ample protection against foreign bodies, since the latter are liable to pass not through the entire cross-section of the apertures 26 but only through that section of same which coincides in plan view with the oblong channels 22.

The invention is not restricted in scope to the ring valves illustrated, being equally applicable to valves of other cross-sectional shapes, such as for example, to plate valves comprising straight ducts.

I claim:

1. An automatic valve, particularly for compressors, comprising two plate-shaped portions, having passageways therethrough and one forming a valve seat and the other a valve guard, both portions being arranged in spaced relationship relative to each other, a closing member on the valve seat and spaced from the valve guard, and spring means between said plate-shaped portions projecting a force between the valve guard and the closing member, the passageways of at least one of said plate-shaped portions consisting of oblong channels separated from each other by webs and partitioned in the area of their outlets on the outer side of the valve by additional webs to produce apertures having a small cross-section as a protection against the passage of foreign bodies, the width of the areas occupied by the said apertures as measured in transverse relation to the oblong channels being greater than the width of the oblong channels.

2. An automatic valve according to claim 1, in which each of the oblong channels communicates with at least two rows of adjacent apertures.

3. An automatic valve according to claim 1, in which each of the oblong channels communicates with at least two rows of adjacent apertures, and in which the said apertures are offset in relation to each other.

References Cited

UNITED STATES PATENTS

| 921,892 | 5/1909 | Rogler | 137—516.13 |
| 1,244,286 | 10/1917 | Breinl | 137—516.13 |
| 1,439,503 | 12/1922 | Clump et al. | 137—512.1 X |
| 1,799,103 | 3/1931 | Klimek | 137—550 X |

FOREIGN PATENTS

| 6,450 | 1913 | Great Britain. |

WILLIAM F. O'DEA, *Primary Examiner.*

D. ZOBKIW, *Assistant Examiner.*